United States Patent [19]

Smashey et al.

[11] Patent Number: 4,574,451
[45] Date of Patent: Mar. 11, 1986

[54] METHOD FOR PRODUCING AN ARTICLE WITH A FLUID PASSAGE

[75] Inventors: Russell W. Smashey, Loveland; Lewis J. Stoffer, Cincinnati, both of Ohio

[73] Assignee: General Electric Company, Cincinnati, Ohio

[21] Appl. No.: 452,242

[22] Filed: Dec. 22, 1982

[51] Int. Cl.⁴ ............... B22D 23/00; B22D 29/00; B23P 17/00; B22C 9/02
[52] U.S. Cl. ................................ 29/423; 164/46; 164/132; 164/34; 427/34; 29/527.5
[58] Field of Search .............. 164/46, 132, 34, 35, 164/36; 29/423, 527.3, 527.5; 427/34

[56] References Cited

U.S. PATENT DOCUMENTS

| | | | |
|---|---|---|---|
| 3,127,641 | 4/1964 | Pertwee | 164/46 |
| 3,320,345 | 5/1967 | Lirones | 164/34 |
| 3,397,732 | 8/1968 | Howell, Jr. | |
| 3,638,299 | 2/1972 | Garner et al. | 164/46 |
| 3,707,152 | 12/1972 | Arnold et al. | 164/132 |
| 3,839,618 | 10/1974 | Muehlberger | |
| 3,909,921 | 10/1975 | Brooks | |
| 4,066,117 | 1/1978 | Clark et al. | |
| 4,147,201 | 4/1979 | Rabinovitch et al. | 164/35 |
| 4,370,789 | 2/1983 | Schilke et al. | 427/34 |

OTHER PUBLICATIONS

D. R. Mash and I. MacP. Brown, *Structure and Properties of Plasma-Cast Materials*, Feb., 1964.

Primary Examiner—Howard N. Goldberg
Assistant Examiner—Vernon K. Rising
Attorney, Agent, or Firm—Lee H. Sachs; Stephen S. Strunck; Derek P. Lawrence

[57] ABSTRACT

A fluid-cooled article, such as a turbomachinery blading member, is provided with a fluid passage by a method of depositing a first material on a work surface of a mandrel by low pressure plasma deposition. A first member thus generated is separated from the mandrel. In one form, an inner surface of the first member is provided with a surface groove. After depositing a sacrificial material in the groove, a cover material is applied to entrap the sacrificial material. Removal of the sacrificial material provides the fluid passage.

11 Claims, 7 Drawing Figures

METHOD FOR PRODUCING AN ARTICLE WITH A FLUID PASSAGE

CROSS REFERENCE TO RELATED APPLICATIONS

This application relates to copending U.S. patent application Ser. No. 292,857 filed Aug. 14, 1981 entitled "Plasma Spray-Cast Components", now U.S. Pat. No. 4,418,124 and to copending and concurrently filed U.S. patent application Ser. No. 452,243, entitled "Article with a Fluid Passage and Method for Making". The disclosures of both said copending applications are hereby incorporated herein by reference.

BACKGROUND OF THE INVENTION

This invention relates to a method for producing an article which includes a fluid passage such as for cooling, and, more particularly, to a method for making a turbomachinery article such as a blading member.

A variety of elevated temperature operating gas turbine engine components, including blades and vanes, have employed fluid-cooling, particularly air. Such cooling enhances the ability of such a member to withstand operation at temperatures in excess of those at which the component's material of construction can operate effectively without such cooling. As gas turbine engine blade design has advanced, the cooling passages within such a component have become increasingly complex. Typical of such air-cooled turbine blades and vanes are those shown in U.S. Pat. Nos. 3,628,880-Smuland et al and 3,628,885-Sidenstick et al, the disclosures of which are incorporated herein by reference. As shown by these and other publications, current air-cooling of blades and vanes is accomplished by a complex internal cooling passage, generally with holes in a wall connecting the internal passage with the blade or vane outer surface such as for film cooling.

While it is difficult to manufacture such complex structures in relatively large blades and vanes used in the larger gas turbine engines, it is extremely difficult and very costly to provide such complex cooling passages within small blades and vanes, for example for use in gas turbine engines which power helicopters or relatively small aircraft.

Currently such turbine blades and vanes are manufactured predominantly by precision casting techniques involving the use of removable casting cores which are complex in shape, difficult to manufacture accurately, difficult to handle and difficult to maintain in position during the casting process. Such cores are generally ceramic in nature and core breakage has been a common type of failure in these processes. Other problems have resulted from core shift, sag, or both, as a result of the high temperatures and sometimes relatively long holding times involved in such a casting operation. Such casting problems have reduced the efficiency of casting and thereby increased the cost of the cast article.

SUMMARY OF THE INVENTION

It is a principal object of the present invention to provide an improved and practical method for producing a fluid passage in an article such as a small blading member without the use of conventional casting cores.

Another object is to provide a method for producing an internal fluid-cooling passage within a blading member through the use of a sacrificial material disposed within the member and later removed to provide the fluid passage.

These and other objects and advantages will be more fully understood from the following detailed description, drawing and the examples, all of which are intended to be representative of rather than in any way limiting on the scope of the present invention.

Briefly, one form of the method of the present invention includes the steps of providing a mandrel which includes a work surface on which a first material is deposited by low pressure plasma deposition. This provides a first member having an inner surface in contact with the work surface. The first member and the mandrel are separated, after which a groove of a selected configuration of at least a portion of the fluid passage is generated in the inner surface of the first member. A sacrificial material is then deposited in the groove and a cover material is applied over the sacrificial material and over at least that portion of the inner surface adjacent the sacrificial material to provide a preform. The preform can then be shaped, if required, to approach closely the shape of the article. Subsequently, the sacrificial material is removed to provide at least a portion of the fluid passage. Alternatively, the sacrificial material can be deposited on the inner surface rather than in a groove in the inner surface.

DESCRIPTION OF THE PREFERRED EMBODIMENTS

The design of modern gas turbine engine turbine blades has evolved from solid blades to blades having air-cooling passages to enable use of nickel, cobalt, or iron-base superalloys at temperatures greater than their mechanical property capabilities would allow without air cooling. Such cooling passages generally are of a type which define a serpentine or labyrinthine path within the blade and communicate with the outer surface of the blade through holes or channels through the outer wall of the blade to provide for film cooling.

It is common practice in the art to provide such complex articles through the use of quartz or ceramic type casting cores disposed within a casting mold in the "lost wax" precision casting technique. After casting, holes or openings through the wall of the casting are provided to enable passage of cooling air from within the blade to the outer surface for film cooling. Such holes or openings are generated by various removal processes such as electrolytic, electrochemical, electrodischarge, laser, mechanical drilling, or various combinations of such techniques. Because the cores are fragile and careful handling is required, their breakage either through handling or during the casting is a problem inherent in that process. Such problem increases with the complexity of the casting core, particularly during the casting of small blades.

A process for the fabrication of free-standing parts was reported in February, 1964, in Metals Engineering Quarterly in an article by Mash and Brown entitled "Structure and Properties of Plasma-Cast Materials". Such a technique involved spraying molten particles onto a mandrel of suitable geometry and, subsequently, removing the mandrel by some convenient means. One procedure for accomplishing such deposition is described in detail in U.S. Pat. No. 3,839,618-Muehlberger issued Oct. 1, 1974, the disclosure of which is incorporated herein by reference. That method is conducted in a low pressure chamber and sometimes is called one form of low pressure plasma deposition. Preferred in the practice of the method of the present invention is an improved form of low pressure plasma deposition described in cross referenced and incorporated application Ser. No. 292,857. Although such improved method provides significantly better properties and microstructure along with near 100% theoretical density, it will be recognized by those skilled in the art that other methods for generating or depositing various portions of a material on a surface involved with the present invention may be provided by a variety of known means.

Figure 1:
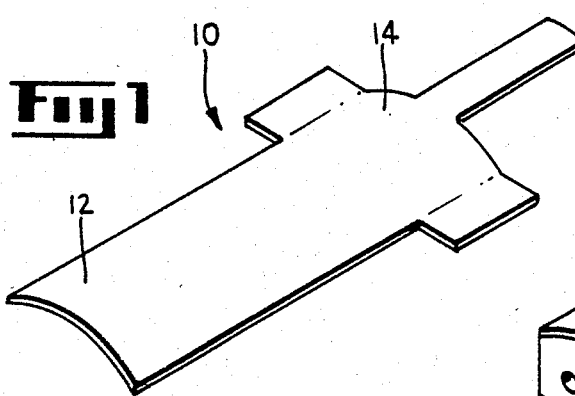
FIG. 1 is a perspective view of a removable mandrel.
Figure 2:
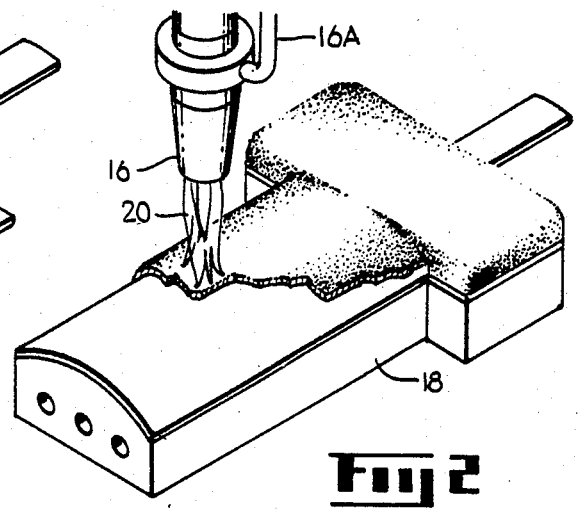
FIG. 2 is a perspective, partially fragmentary view of the mandrel of FIG. 1 positioned on a heated mandrel support and receiving deposited material.

With reference to the drawing, FIG. 1 is a perspective view of a removable mandrel, for example, of mild steel, iron, copper or other leachable material. The mandrel shown in FIG. 1 includes a work surface 10 comprising an airfoil work surface 12 and a base work surface 14. According to the method of the present invention, a first material such as a nickel-base superalloy is deposited by the above-identified low pressure plasma deposition process, represented diagrammatically in FIG. 2 as a nozzle member 16 including powder tube 16A. FIG. 2 is a perspective view of the mandrel of FIG. 1 positioned on a heated mandrel support 18 to enable work surface 10 in FIG. 1 to receive deposition of first material 20 by low pressure plasma deposition. Alternatively, the removable mandrel can be in the form of a film of metal or oxide, deposited or disposed on the heated mandrel support and which will effect a quick and clean release of a superimposed deposit. In order to cover work surface 10 to the desired extent, it is common practice to provide relative movement between such a mandrel and the deposition apparatus, such as by rotation, translation, etc. In this way, there is provided a first member which at this point in the process is in contact at an inner surface with the work surface of the mandrel. The mandrel and the first member are then separated such as by chemical disolution of the mandrel in a manner which has substantially no adverse effect on the first member.

Figure 3:
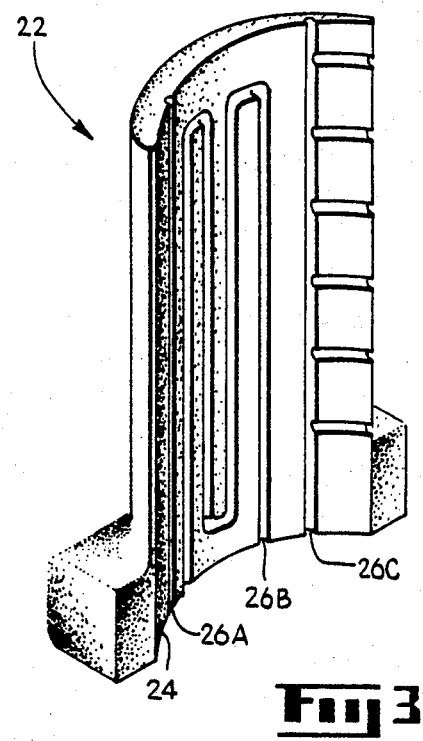
FIG. 3 is a perspective view of a member produced in FIG. 2 and separated from the mandrel.

FIG. 3 is a perspective view of first member 22 having an inner surface 24 which was in contact with work surface 10 of the mandrel. One form of the method of the present invention then generates in inner surface 24 of first member 22 a groove, which herein is intended to mean a single continuous groove or a pattern of grooves represented by 26A, 26B and 26C in FIG. 3. The groove or pattern of grooves is of a selected configuration of at least a portion of the fluid passage intended to be produced in an article. Such groove or pattern of grooves can be generated by a variety of means, some of which can be programmed or automated. For example, it can be provided by selective chemical etching or chemical milling using appropriately placed stop-off materials, by the process of photoetching, by electrochemical or electrodischarge machining, by mechanical cutting or milling, by laser, by electron beam, or by other material removal processes which are capable of generating an appropriately configured indentation in inner surface 24 of first member 22, alone or in various combinations.

A preferred method for generating complex shaped grooves or groove patterns is the process of photoetching, well known and used in industry. For example, manufacture of certain electrical printed circuit boards uses photoetching. In such a process, as it relates to the present invention, a metal surface is coated with a photosensitive emulsion which is resistant to etchant chemicals. Then portions of such surface are selectively exposed to light, for example by projecting an image of the groove or groove pattern onto the surface. The emulsion is developed to provide areas with and without emulsion, depending on the projected pattern. When the surface is subjected to an appropriate chemical etchant solution, those areas without emulsion are chemically dissolved to provide the groove or groove pattern to a selected depth.

After generation of a groove or pattern of grooves, a sacrificial material is deposited or positioned in the groove. The sacrificial material can be of a variety of materials which can be removed, without irreversible damage to such members as 22, such as by melting, flushing, chemical removal or etching, preferential diffusion into one or more surrounding materials, etc. One form of material which has such a capability is a metal, for example, nickel or an alloy of nickel, particularly useful in cooperation with the first member in the form of a nickel-base superalloy. The nickel can be deposited by such means as electro or electroless plating, spray deposition, vapor deposition, pressing, etc., using appropriate stop-off materials, as required.

Figure 4:
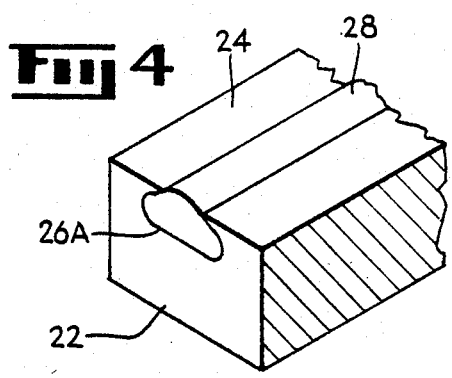
FIG. 4 is a fragmentary, sectional view of sacrificial material in a groove in a member.
Figure 5:
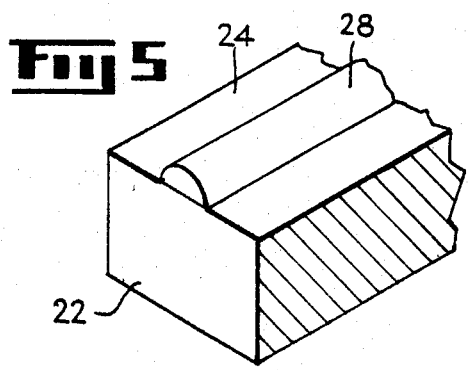
FIG. 5 is a fragmentary, sectional view of sacrificial material on a surface of a member.

Another form of the present invention includes the step of depositing the sacrificial material in the selected pattern directly onto surface 24 of member 22 without the creation of a groove or pattern of grooves. The fragmentary, sectional views of FIGS. 4 and 5 show the disposition of sacrificial material 28 in or on inner surface 24. In FIG. 4, for example, sacrificial material 28 is disposed in groove 26A of FIG. 3.

Figure 6:
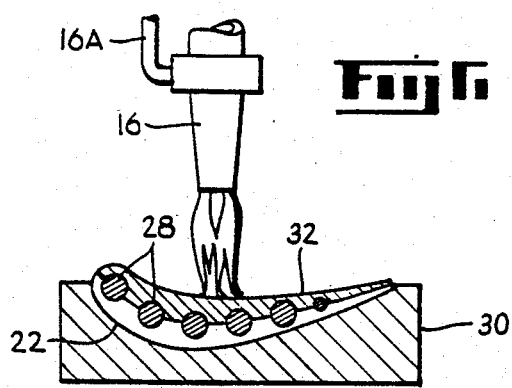
FIG. 6 is a diagrammatic, partially sectional view of the disposition of a cover material over the sacrificial material and member surface.

After disposition of the sacrificial material as described above, in or on inner surface 24, a cover material is applied over the sacrificial material and over at least that portion of the inner surface adjacent the sacrificial material to entrap the sacrificial material and to provide a preform. This is shown in the diagrammatic, partially sectional view of FIG. 6 wherein first member 22 is disposed on a heated member support 30 and a cover material 32 of the same or different material from that of the material first member 22 is deposited by low pressure plasma deposition represented by nozzle 16. In such a process, sacrificial material 28 and at least that portion of inner surface 24 adjacent sacrificial material 28 is covered, thereby entrapping sacrificial material 28 between first member 22 and cover material 32 to provide a preform, shown as 34 in FIG. 7.

Figure 7:
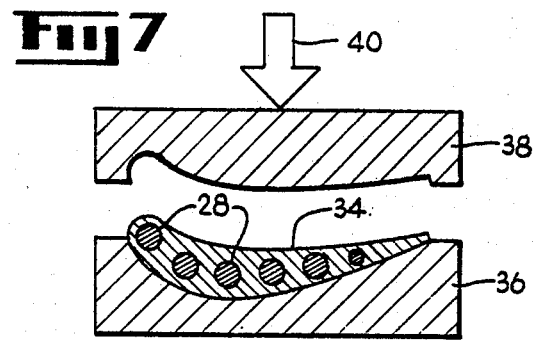
FIG. 7 is a diagrammatic sectional view of shaping of a preform.

The preform then can be shaped, if desired or required, to approach closely the shape of the article being produced. Sometimes this is called a near-net-shape article. FIG. 7 is a diagrammatic, sectional view representing one form of such shaping. In FIG. 7, preform 34 is disposed within a cavity in lower die 36 of an isothermal forging press. Subsequently applied pressure between lower die 36 and upper die 38 through a force represented by arrow 40 shapes preform 34, which still includes entrapped sacrificial material 28, to a shape which approaches closely the shape of the article being produced. Although isothermal forging has been described as an example of a means which can be used to shape preform 34, it will be recognized by those skilled in the art that other operations such as coining, explosive forming, machining, grinding, etc. can be used, with or without the application of temperature, pressure or their combinations. The sacrificial material is removed such as by melting, flushing, chemical removal or etching, preferential diffusion into one or more of the surrounding or entrapping materials, etc., to provide at least a portion of the fluid passage.

If desired, the hollow article thus produced can then be thermo-mechanically processed to produce a more desirable grain configuration for enhanced mechanical properties, in a manner well-known and described in the art. For example, it can be simple grain growth by exposure to heat to improve high temperature stress rupture behavior. Another example of such processing is directional recrystallization such as is described in U.S. Pat. No. 3,772,090-Allen et al patented Nov. 13, 1973. In addition, the well-known, commercially available hot isostatic pressing technique can be used to densify the metallurgical structure of the article, preferably before removal of the sacrificial material. After such additional processing, the article can be finish machined to a final shape. Other processing options will be recognized by those skilled in the art.

In one specific example, a turbine blade member preform for a gas turbine engine was made by providing a stamped sheet metal mandrel of low carbon, acid leachable steel and shaped generally as shown in FIG. 1. Such mandrel was securely locked onto a mandrel support which was heated to a temperature of about 1800° F. A commercially available nickel-base superalloy powder, sometimes referred to as René 80 alloy and described in U.S. Pat. No. 3,615,376, issued Oct. 26, 1971, was deposited by low pressure plasma deposition of the type described in the cross-referenced and incorporated application Ser. No. 292,857 on the work surface of the mandrel to a thickness in the range of about 0.03-0.06 inch. This provided a first member of such alloy as the first material. To separate the first member and the mandrel, the mandrel was dissolved in a chemical solution of nitric acid and water without affecting the first member. In this way, there was provided a first member including an inner surface which had been a contact surface or interface with the mandrel.

A groove was generated in the inner surface of the first member by photoetching to a pattern desired for internal blade cooling. The groove generated was about 0.015 inch in cross section. The groove was filled with electroplated nickel, as a sacrificial material, in a conventional manner well-known and commercially used in the art, with a stop-off material to guide the deposition. After electroplating, the stop-off material was removed. Then, the first member, carrying the sacrificial material in the groove, was disposed on a support member with the inner surface and the sacrificial material available to a low pressure plasma deposition nozzle. A cover material of the above-described René 80 nickel-base superalloy was applied by the above-identified type of low pressure plasma deposition over the sacrificial material and over at least that portion of the inner surface adjacent the sacrificial material to provide a preform. After such operation, the sacrificial material was removed using an aqueous chemical etching solution of about 50 volume % nitric acid. Removal of the sacrificial material provided the fluid passage in the article.

Undesirable corners or edges which might exist at walls of the fluid passage after removal of the sacrificial material, for example, at a juncture between the first member and the cover material, can be eliminated or reduced and the shape of the passage refined by circulation of a chemical material removal solution through the passage.

Although the present invention has been described in connection with specific embodiments and examples, it will be understood by those skilled in the art that the invention is capable of variations and modifications within the scope of the appended claims.

What is claimed is:
1. In a method for producing an article which includes a fluid passage, the steps of:
 (a) providing a mandrel including a work surface;
 (b) deposition a first material on the work surface by low pressure plasma deposition to provide a first member having an inner surface in contact with the work surface;
 (c) separating the first member and the mandrel;
 (d) generating in the inner surface of the first member a groove of a selected configuration of at least a portion of the fluid passage;
 (e) depositing a sacrificial material in the groove;
 (f) applying a cover material over the sacrificial material and over at least that portion of the inner surface adjacent the sacrificial material to provide a preform; and then
 (g) removing the sacrificial material to provide at least a portion of the fluid passage.

2. The method of claim 1 in which the groove is generated in the inner surface by photoetching.

3. The method of claim 1 in which a chemical material removal solution is circulated through the fluid passage to refine the fluid passage.

4. The method of claim 1 in which, after removal of the sacrificial material, the article is thermomechanically processed to produce a more desirable grain configuration.

5. The method of claim 1 in which, after applying the cover material and before removing the sacrificial material, the preform is shaped to approach the shape of the article.

6. The method of claim 5 in which the step of shaping the preform includes subjecting the preform to hot isostatic pressing to densify metallurgical structure of the article.

7. In a method for producing an article which includes a fluid passage, the steps of:
 (a) providing a mandrel including a work surface;
 (b) depositing a first material on the work surface by low pressure plasma deposition to provide a first member having an inner surface in contact with the work surface;
 (c) separating the first member and the mandrel;
 (d) depositing on the inner surface of the first member a sacrificial material in a selected configuration of at least a portion of the fluid passage;
 (e) applying a cover material over the sacrificial material and over at least that portion of the inner surface adjacent the sacrificial material to provide a preform; and then (f) removing the sacrificial material to provide at least a portion of the fluid passage.

8. The method of claim 7 in which a chemical material removal solution is circulated through the fluid passage to refine the fluid passage.

9. The method of claim 7 in which, after removal of the sacrificial material, the article is thermomechanically processed to produce a more desirable grain configuration.

10. The method of claim 7 in which, after applying the cover material and before removing the sacrificial material, the preform is shaped to approach the shape of the article.

11. The method of claim 10 in which the steps of shaping the preform includes subjecting the preform to hot isostatic pressing to densify metallurgical structure of the article.

* * * * *